United States Patent
Cherubini

[11] Patent Number: 5,319,674
[45] Date of Patent: Jun. 7, 1994

[54] METHOD FOR SELF-TRAINING ADAPTIVE EQUALIZATION

[75] Inventor: Giovanni Cherubini, Ruschlikon, Switzerland

[73] Assignee: International Business Machines Corporation, Armonk, N.Y.

[21] Appl. No.: 781,538

[22] Filed: Oct. 22, 1991

[30] Foreign Application Priority Data

Oct. 30, 1990 [EP] European Pat. Off. ............ 90810828

[51] Int. Cl.$^5$ .......................... H03H 7/30; H03H 7/40
[52] U.S. Cl. ........................................ 375/14; 375/13; 375/101; 364/724.2
[58] Field of Search ...................... 333/18; 364/724.19, 364/724.2; 375/13, 14, 16, 18, 101

[56] References Cited

U.S. PATENT DOCUMENTS

| | | | |
|---|---|---|---|
| 4,635,276 | 1/1987 | Karabinis | 375/16 X |
| 4,694,451 | 9/1987 | Adams et al. | 375/14 X |
| 4,829,463 | 5/1989 | Kakishita et al. | 364/724.19 |
| 5,132,988 | 7/1992 | Fisher et al. | 375/14 |
| 5,164,962 | 11/1992 | Nakai et al. | 375/13 |

Primary Examiner—Stephen Chin
Assistant Examiner—Bryan Webster
Attorney, Agent, or Firm—Leslie G. Murray

[57] ABSTRACT

A method is disclosed for adapting, in a self-training procedure, an equalizer based on distributed-arithmetic design. In such an equalizer, in each modulation interval addresses are derived from stored received signal samples $x_n^q$ to choose some of the values stored in a look-up table. The chosen table values are combined by shift-and-add operations to obtain an equalizer output value $y_n$. According to the novel adaptation scheme, only one of the chosen look-up table values is selected per modulation interval, for updating it in a particular fashion to reduce the error detected. The disclosed scheme ensures uniform selection of the stored look-up table values for updating. Only one additional shift-and-add operation is required per modulation interval to achieve satisfactory adaptation of the equalizer. No training sequence is required to be transmitted, and the scheme converges in all situations.

8 Claims, 6 Drawing Sheets

TIME-DISCRETE MODEL OF A PR IV SYSTEM

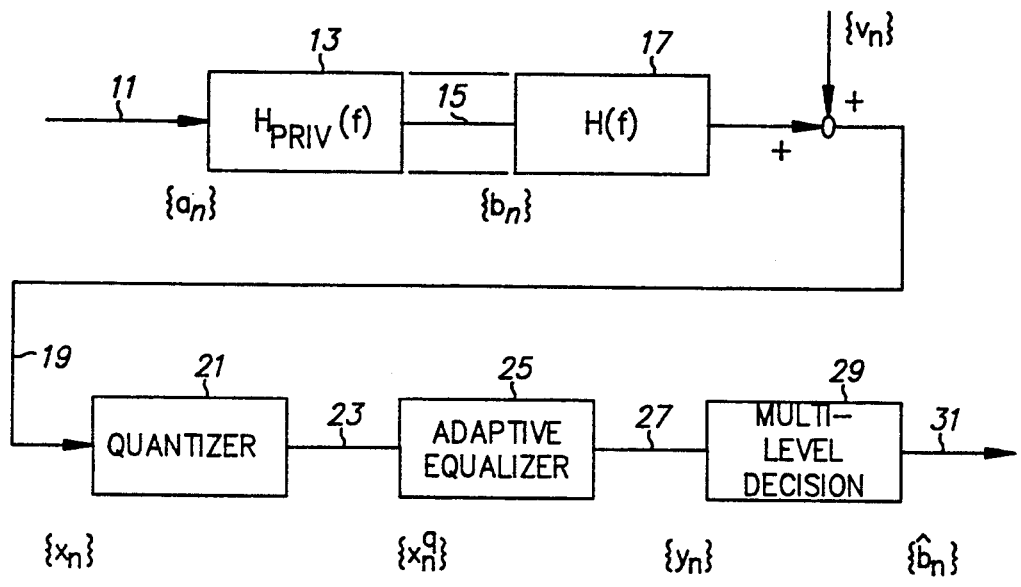
TIME-DISCRETE MODEL OF A PR IV SYSTEM
FIG. 1
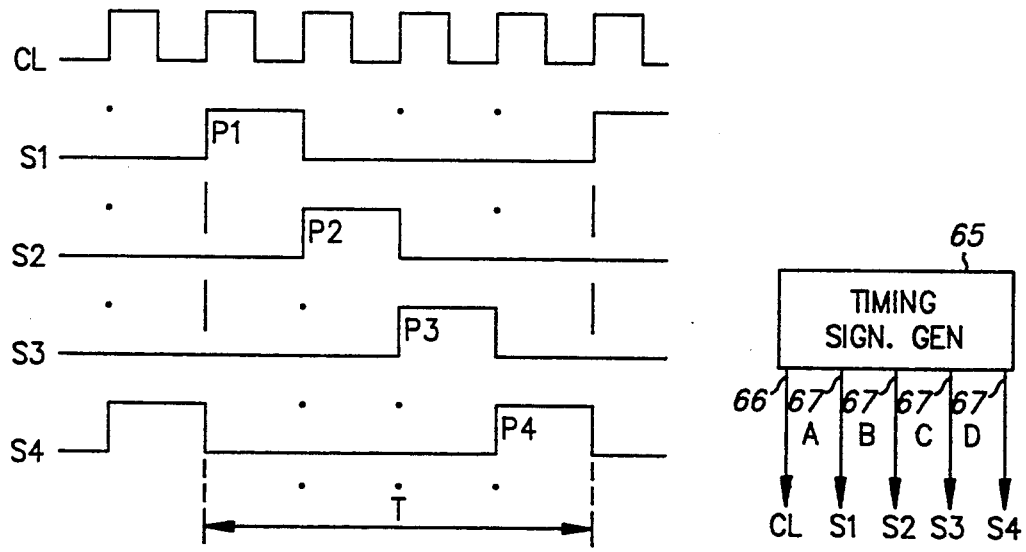
FIG. 4B    FIG. 4A

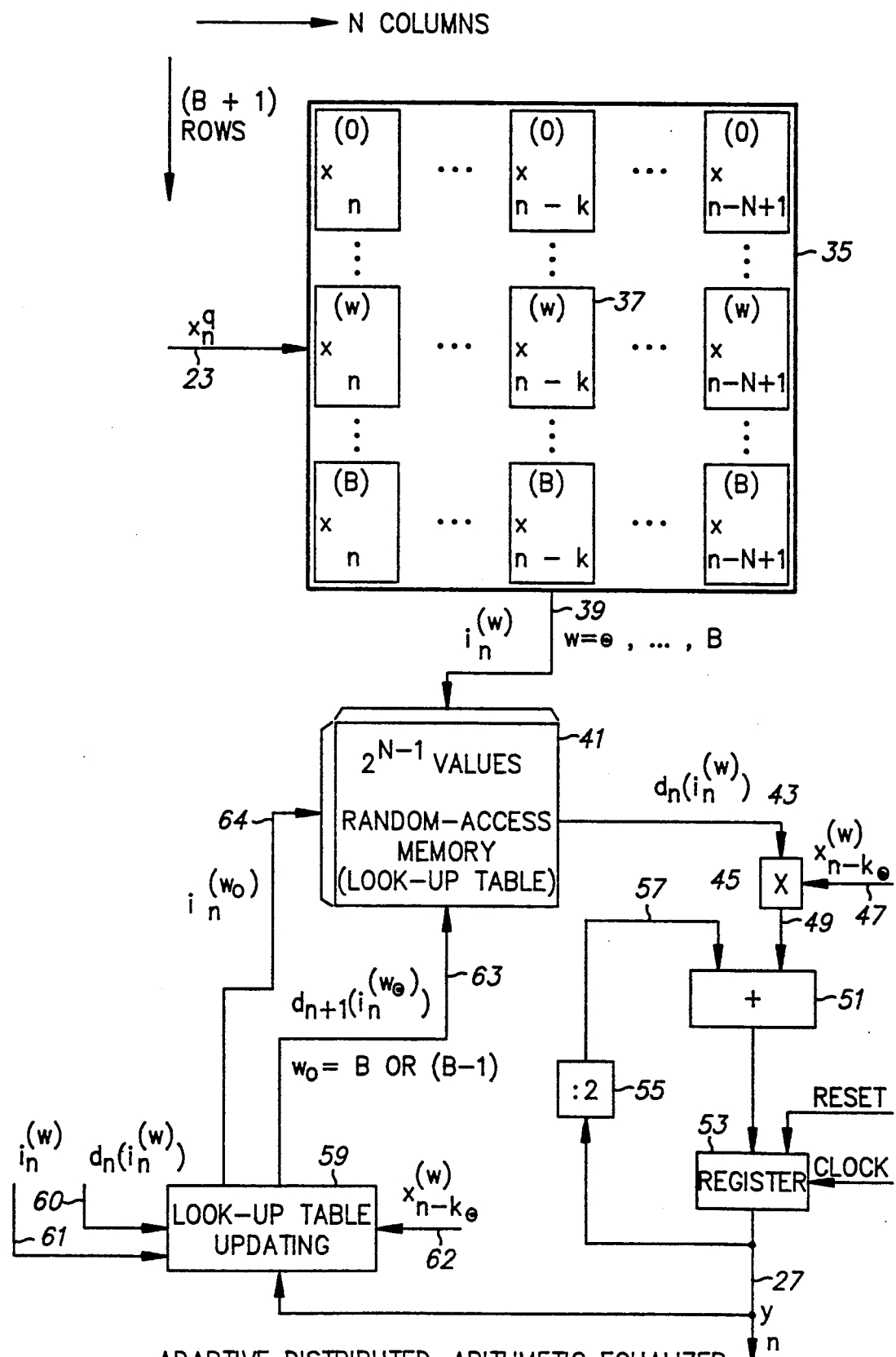
FIG. 2 — ADAPTIVE DISTRIBUTED-ARITHMETIC EQUALIZER

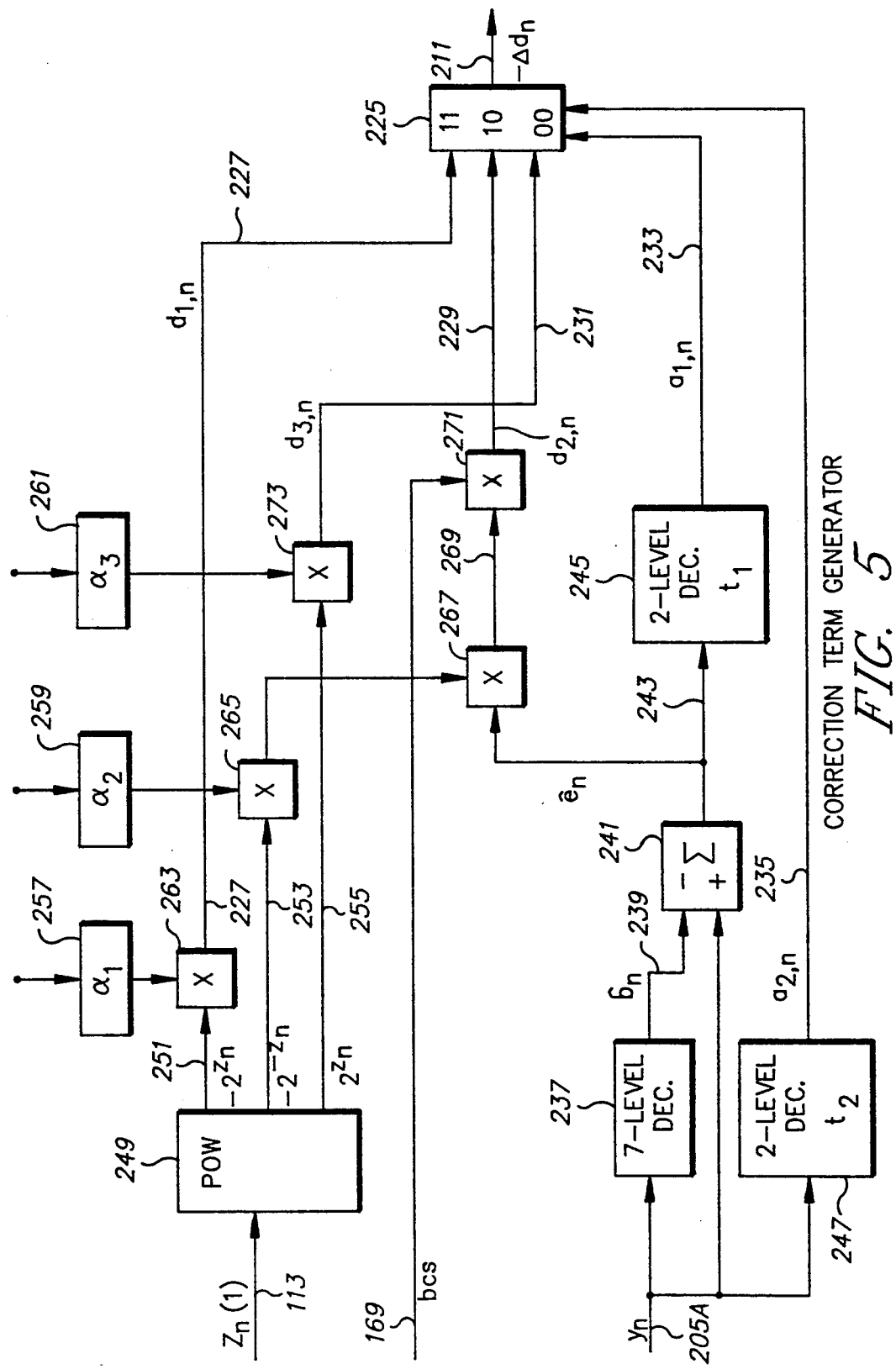

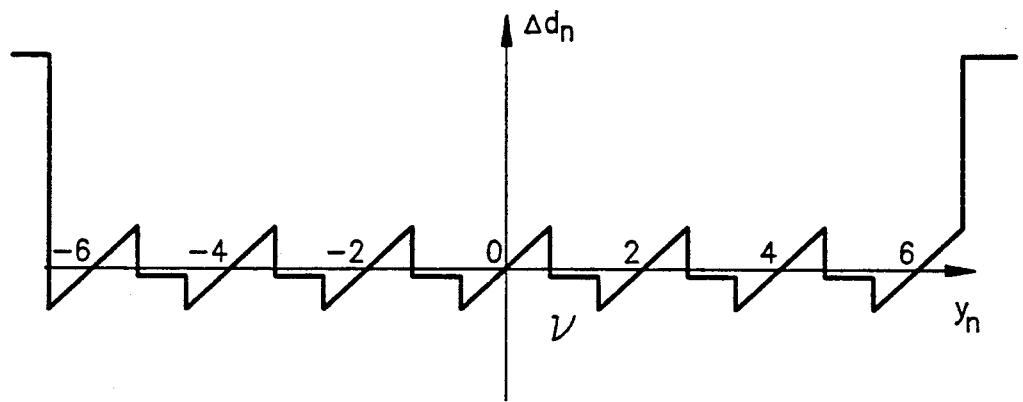
CORRECTION TERM FOR $X_n^{(B-z_n)} = 1$, $M = 4$
$n -- k_\ominus$
*FIG. 6*
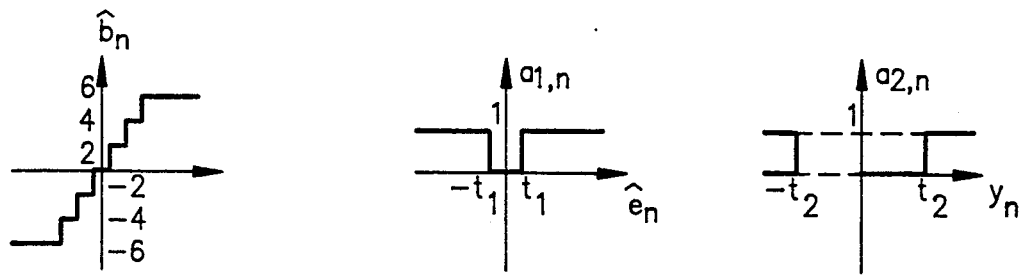
7-ELEMENT
DECISION ELEMENT
2-LEVEL DECISION
ELEMENT
THRES 1 = $t_1$ = $\nu$
2-LEVEL DICISION
ELEMENT
THRES 2 = $t_2$ = $2M - 2 + \nu$
*FIG. 7*     *FIG. 8*     *FIG. 9*

METHOD FOR SELF-TRAINING ADAPTIVE EQUALIZATION

BACKGROUND OF THE INVENTION

The present invention is concerned with adaptive equalization of channels for data transmission or storage, and in particular with a method of adapting a distributed-arithmetic equalizer by updating a look-up table containing values that determine the equalizer characteristics, and further with look-up table updating means in an adaptive distributed-arithmetic equalizer apparatus for channel equalization in a partial-response communication or storage system.

A self-training adaptive equalization scheme is known from the following publication: Y. Sato, "A Method of Self-Recovering Equalization for Multi-Level Amplitude Modulation Systems", IEEE Trans. Comm., Vol. COM-23, pp. 679–682, June 1975. In the scheme disclosed, updating of the equalizer coefficients requires N multiplications as well as the computation of a particular function $g_k$; the latter requires, in the case of Partial-Response Class-IV (PRIV) signaling, an inversion of the PRIV channel and generation of a two-level PRIV signal. Furthermore, in the steady state the described linear adaptive equalizer undergoes enhanced tap noise with respect to a decision-directed adaptive equalizer.

A new filter design was disclosed in an article by A. Peled et al. "A New Hardware Realization of Digital Filters", IEEE Trans. Acoustics, Speech, Signal Processing, Vol. ASSP-22, pp. 456–462, December 1974. The new technique has become known as "distributed-arithmetic" filter design. However, the publication does not disclose any application of the filter as an adaptive equalizer.

An adaptive equalizer using a distributed-arithmetic architecture was described in the following publication: C. F. N. Cowan et al., "A Digital Adaptive Filter Using a Memory-Accumulator Architecture: Theory and Realization", IEEE Trans. Acoustics, Speech, Signal Processing, Vol. ASSP-31, pp. 541–549, June 1983. The look-up table value updating scheme disclosed in this article is based on a least mean-square algorithm, and no attempt is made to use the distributed-arithmetic equalizer in a self-training mode. For training the equalizer, transmission and recognition of a training sequence would normally be required.

It would be desirable to have an equalization method and apparatus avoiding the disadvantages of known equalization devices and procedures. Therefore it is an object of the invention to provide an equalization scheme using a distributed-arithmetic technique, which is self-training on the received data signal and therefore needs no training sequence.

It is another object to devise a self-training adaptive equalization scheme with low tap noise in the steady state.

It is a further object to provide a self-training adaptive equalization scheme which allows a reduction in hardware complexity for the equalizer apparatus.

SUMMARY OF THE INVENTION

A distributed-arithmetic equalizer according to the principles of the present invention comprises a delay line for digitally storing sequentially received signal samples, each digital sample represented by a sequence of bits, coupled to a random-access memory (RAM) for storing a look-up table having a plurality of table values, $d_n(j)$, which determine the equalizer characteristics, address means coupled to the RAM for fetching at least two of said table values, processing means coupled to the RAM and the address means for processing the fetched table values and for generating an equalizer output value $y_n$ and look-up table value updating means coupled to the RAM, the delay line and the processing means and responsive to a binary control value $Z_n$ for generating a correction term $-\Delta d_n$ and combining the generated correction term with a selected one $d_n$ of the fetched table values for providing an updated table value $d_{n+1}$ for replacing the selected one $d_n$ of the fetched table values and being stored in the look-up table. The equalizer utilizes groups of bits selected from the bits representing the digitally stored received samples to generate look-up table addresses to select and fetch table values and combines the fetched table values to generate one equalizer output value $y_n$ per modulation interval. Additionally, the equalizer circuitry selects a particular table value, $d_n$, of the fetched table values utilized to generate one equalizer output value $y_n$, generates a correction term $-\Delta_n$ dependent on the one equalizer output value and combines the correction term with the selected table value $d_n$. The value of the resulting, updated table value $d_{n+1}$ then is stored in the RAM where it replaces the selected table value $d_n$ in the look-up table.

The adaptation scheme utilized in the equalizer of the present invention selects only one of the fetched look-up table values in each modulation interval for updating, thus requiring only one additional shift-and-add operation per modulation interval to achieve satisfactory adaptation of the equalizer. Additionally, under the described scheme, uniform selection of the stored look-up table values for updating is ensured. Since the adaptation scheme is dependent on only the equalizer input and output signals, no training sequences are required to be transmitted to affect adaptation of the equalizer.

BRIEF DESCRIPTION OF THE DRAWING

FIG. 1 is a block diagram of the model of a system in which the present invention is used;

FIG. 2 depicts the principle of an adaptive distributed-arithmetic equalizer according to the present invention;

FIGS. 4A and 4B are a block representation and a timing diagram, respectively, for the clock and phase signals used in the equalizer of shown in FIGS. 3A and 3B;

FIG. 5 is a detailed block diagram of the correction term generator of the equalizer shown in FIGS. 3A and 3B;

FIG. 6 is a diagram showing the correction term value vs. the equalizer output value for the case where $x_{n-k_0}^{(B-z_n)} = 1$;

FIG. 7 is a diagram showing the characteristic of the 7-level decision element in the correction term generator shown in FIG. 5;

FIG. 8 is a diagram showing the characteristic of the 2-level decision element with threshold t1 in the correction term generator of FIG. 5 and;

FIG. 9 is a diagram showing the characteristic of the 2-level decisionelement with threshold t2 in the correction term generator of FIG. 5.

DETAILED DESCRIPTION OF THE PREFERRED EMBODIMENT

A) Environment

Figure 3A:
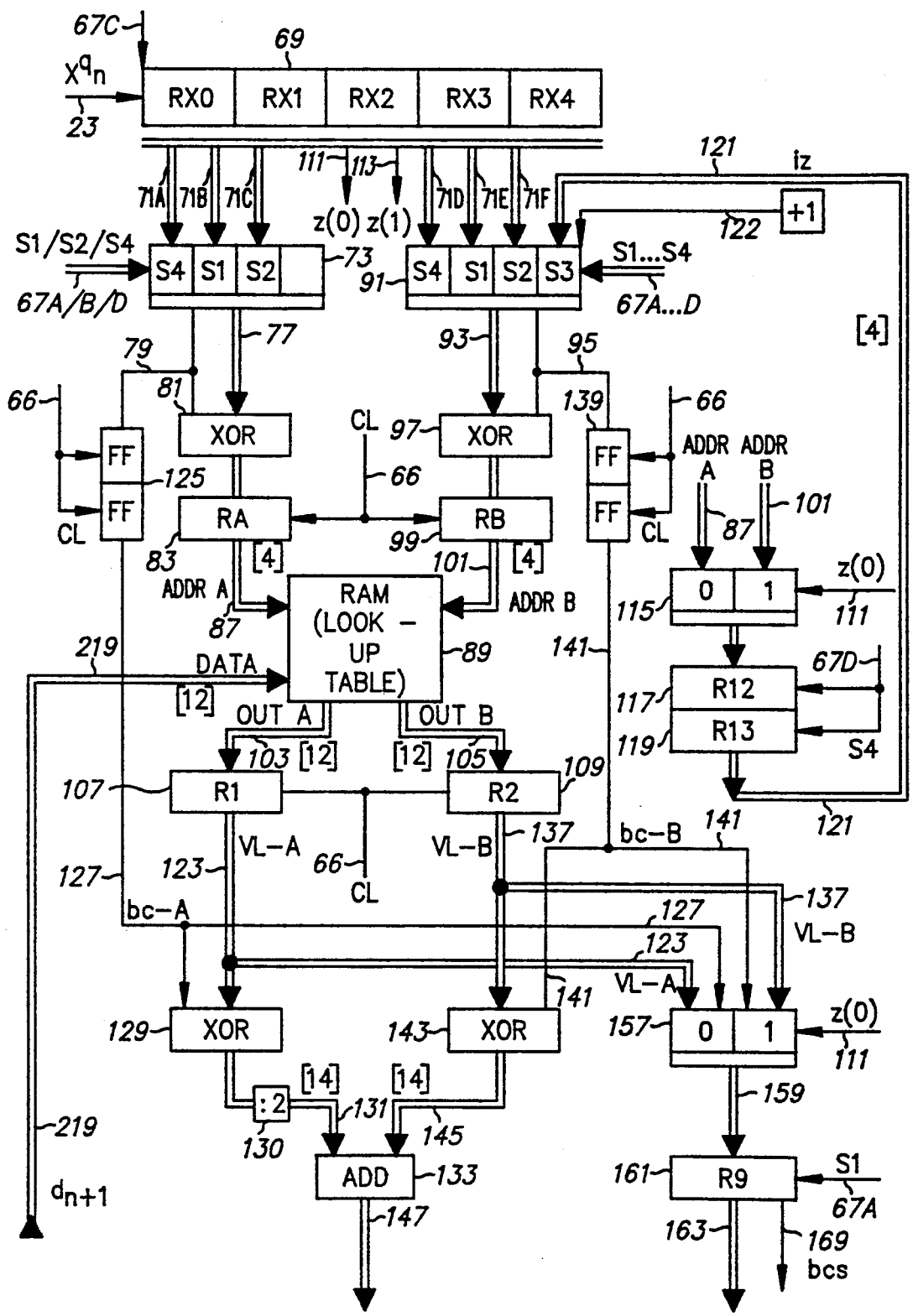
FIGS. 3A and 3B are a detailed block diagram of the distributed-arithmetic equalizer of FIG. 2.

The environment or general system in which the present invention is used is shown in FIG. 1. It may be a communication system, or a magnetic or optical recording system of the partial-response class-IV type. FIG. 1 represents a time-discrete model of such a system. The sequence of transmitted data $\{a_n\}$ provided at input 11 consists of independent and identically distributed (i.i.d.) symbols from the M-ary alphabet $\{\pm 1, \pm 3, \ldots, \pm(M-1)\}$, $M = 2^m$. A non-ideal PRIV channel is considered. The overall channel transfer function is modeled as the cascade of an ideal PRIV transfer function $H_{PRIV}(f) = 1 - e^{-j4\pi fT}$, (shown as block 13) where T is the modulation interval, and a transfer function H(f), (shown as block 17) which determines the channel distortion. Since a time-discrete model is considered, H(f) is a periodic function, the period of which is equal to the modulation rate $f_R = 1/T$, i.e., $H(f) = H(f + lf_R)$, $\forall l \in Z$, where Z is the set of integers. The output of an ideal PRIV channel is $$b_n = a_n - a_{n-2}, \tag{1}$$

which shows the introduction of controlled intersymbol interference (ISI). The sequence $\{b_n\}$ (shown at 15) consists of correlated symbols from the (2M−1)-ary alphabet $\{0, \pm 2, \ldots, \pm(2M-2)\}$. The received signal appearing at the receiver input 19 is given by $$x_n = \sum_k h_k b_{n-k} + \nu_n, \tag{2}$$

where $\{h_k\}$ is the inverse Fourier transform of H(f), and $\{\nu_n\}$ is a sequence of i.i.d. Gaussian noise samples with zero mean and variance $\rho^2$.

In the receiver, prior to equalization, the signal sample $x_n$ is quantized in quantizer 21 and represented in binary notation by the (B+1)-bit vector $u_n = \{u_n^{(0)}, \ldots, u_n^{(B)}\}$. The quantized sample appearing at 23 is then given by $$x_n^q = Q_x\{x_n\} = M \sum_{w=0}^{B} x_n^{(w)} 2^{w-B}, \tag{3}$$

where $x_n^{(w)} = 2u_n^{(w)} - 1 \in \{-1, +1\}$. In the following, since there is one-to-one correspondence between $x_n^{(w)}$ and $u_n^{(w)}$, they will both be referred to as bits, bearing in mind that the former belong to the set $\{-1, +1\}$, the latter belong to the set $\{0, +1\}$. Note that the quantizer output belongs to the interval $(-2M + 2^{-B}M, 2M - 2^{-B}M)$. It is assumed that the probability of the event $\{|x_n| > 2M\}$ is negligible. Therefore the quantizer 21 is approximately equivalent to a uniform quantizer.

The quantized samples appearing at 23 are processed in an adaptive equalizer 25 which is implemented as distributed-arithmetic equalizer. Consider the vector $\underline{c} = \{c_0, \ldots, c_{N-1}\}$ of coefficients of an N-tap linear equalizer, and the vector $\underline{x}_n^q = \{x_n^q, \ldots, x_{n-N+1}^q\}$ of signals stored at time n in its delay line. The output of an equalizer with distributed-arithmetic architecture is computed as follows:

$$y_n = \underline{c} \underline{x}_n^{qT} = M \sum_{k=0}^{N-1} c_k \sum_{w=0}^{B} x_{n-k}^{(w)} 2^{w-B} = \tag{4}$$

$$M \sum_{w=0}^{B} 2^{w-B} \left[ \sum_{k=0}^{N-1} x_{n-k}^{(w)} c_k \right]$$

$$= M \sum_{w=0}^{B} 2^{w-B} v(x_n^{(w)}, \ldots, x_{n-N+1}^{(w)}).$$

This shows that $y_n$ can be obtained as a weighted sum of B+1 look-up values $v(x_n^{(w)}, \ldots, x_{n-N+1}^{(w)})$ for $w = 0, \ldots, B$. The look-up values of a fixed distributed-arithmetic equalizer are determined by the $2^N$ possible values of the vector $\underline{x}_n^{(w)} = \{x_n^{(w)}, \ldots, x_{n-N+1}^{(w)}\}$, precomputed and stored in a look-up table.

Since $v(x_n^{(w)}, \ldots, x_{n-N+1}^{(w)})$ and $v(-x_n^{(w)}, \ldots, -x_{n-N+1}^{(w)})$ differ only in their sign, i.e., $v(\underline{x}_n^{(w)}) = -v(-\underline{x}_n^{(w)})$, only $2^{N-1}$ memory locations are needed. By exploiting this symmetry, (4) can be written in the form $$y_n = M \sum_{w=0}^{B} 2^{w-B} x_{n-k_0}^{(w)} \left( c_{k_0} + x_{n-k_0}^{(w)} \sum_{\substack{k=0 \\ k \neq k_0}}^{N-1} x_{n-k}^{(w)} c_k \right), \tag{5}$$

where $k_0$ can be any index between 0 and N−1. The number of look-up values to be stored is $2^{N-1}$, and $x_{n-k_0}^{(w)}$ determines whether the selected coefficient is to be added or subtracted.

The look-up values are initially set such that the equalizer is equivalent to a linear filter with $$\begin{cases} c_k = 1 & \text{if } k = k_0 \\ c_k = 0 & \text{otherwise} \end{cases} \tag{6}$$

and are thereafter iteratively updated. The output of adaptive distributed-arithmetic equalizer 25, appearing at 27, is $$y_n = M \sum_{w=0}^{B} 2^{w-B} x_{n-k_0}^{(w)} d_n(i_n^{(w)}), \tag{7}$$

where $d_n(j)$, $j = 0, \ldots, 2^{N-1} - 1$, is the set of look-up values at the n-th iteration, and where the index $i_n^{(w)}$ is given by $$i_n^{(w)} = \begin{cases} \sum_{k=0}^{k_0-1} u_{n-k}^{(w)} 2^k + \sum_{k=k_0+1}^{N-1} u_{n-k}^{(w)} 2^{k-1} & \text{if } x_{n-k_0}^{(w)} = +1, \\ 2^{N-1} - 1 - \sum_{k=0}^{k_0-1} u_{n-k}^{(w)} 2^k - \sum_{k=k_0+1}^{N-1} u_{n-k}^{(w)} 2^{k-1} & \text{if } x_{n-k_0}^{(w)} = -1. \end{cases} \tag{8}$$

The output values $y_n$ of equalizer 25 are furnished to a multilevel decision element 29 which provides at its output 31 a sequence of estimated symbols $\hat{b}_n$.

B) Principles of the Self-Training Adaptive Distributed-Arithmetic Equalizer

The principles of an adaptive distributed-arithmetic equalizer using the invention are illustrated in FIG. 2. It is assumed that the input values $x_n^q$ furnished to the equalizer are quantized and represented by $(B+1)$ bits each.

Block 35 represents the equalizer delay line for storing N consecutive $(B+1)$-bit input values $x_n^q$. Bit positions are indicated by superscripts $(0) \ldots (w) \ldots (B)$, and the consecutive modulation intervals are indicated by subscripts $n \ldots (n-k) \ldots (n-N+1)$. Each box 37 in block 35 represents a bit storage position. Each column contains a complete value $x_n^q$, each row contains the corresponding bits $(x_n^{(w)} \ldots x_{n-N+1}^{(w)})$ of all values stored in the delay line. When a new value is entered at input 23, all stored values are shifted by one position.

During each modulation interval, all stored bits are read out sequentially. Each group of N corresponding bits with superscript $(w)$ is used to compute an address (that appears on output lines 39) for the look-up table stored in random-access memory 41, as shown by Eq.(8).

This look-up table contains $2^{N-1}$ look-up values $d_n(j)$ for $j=0, \ldots, 2^{N-1}-1$, which determine the characteristics of the equalizer. They are selected using the bits of the stored values $x_n^q$ to compute the addresses. For generating one output value $y_n$ of the equalizer, $(B+1)$ look-up values are fetched sequentially during one modulation interval and are combined by shift-and-add operations.

The look-up values, like the input values $x_n^q$ are also quantized and each represented by $B_d$ bits. Each $(N-1)$-bit address $i_n^{(w)}$ appearing on lines 39 causes fetching of one look-up value $d_n(i_n^{(w)})$ which is furnished on lines 43. This value is multiplied, in multiplying means 45, by a single bit $x_{n-k_0}^{(w)}$ which is available on line 47. This bit is one predetermined bit of the bit group $(x_n^{(w)} \ldots x_{n-N+1}^{(w)})$ presently used to compute an address for the look-up table, i.e., the corresponding bit $x_{n-k_0}^{(w)}$ of the input sample presently available at the pre-determined tap of the delay line.

The output of multiplying means 45, available on lines 49, is furnished to an accumulator arrangement comprising adder means 51, a register 53, and dividing means 55 which divides each register output by 2 (and which is actually a shifting means). The output of dividing means 55 is entered through lines 57 into adder means 51 where it is combined with the next partial value appearing on lines 49, the result being stored with the next clock pulse in register 53.

Finally, at the end of each modulation interval, a new equalizer output value $y_n$ is available on lines 27. This output value $y_n$ is then used to update, according to the invention, a single one of those look-up values stored in RAM 41 which were chosen in the current modulation interval for generating the output value $y_n$. Details of the selection and updating procedure which is introduced by the invention are presented in the next sections C and D.

In FIG. 2, only a schematic representation of this updating procedure is given. Updating means 59 receives as inputs the equalizer output value $y_n$ on lines 27, and all addresses $i_n^{(w)}$ and corresponding look-up values $d_n(i_n^{(w)})$ chosen to compute $y_n$, on lines 60 and 61, respectively. The single bits $x_{n-k_0}^{(w)}$ which previously appeared on line 47 are also provided on input 62. As output of the updating means 59, there appear on lines 63 and 64, respectively, a single updated look-up value $d_{n+1}(i_n^{(w_0)})$ and its corresponding address $i_n^{(w_0)}$, where $w_0$ can be either B or $(B-1)$. Hence, for updating there will be selected only one look-up value, either that adressed by the most significant bits (B) or that addressed by the second-most significant bits $(B-1)$ presently stored in the delay line 35. The selection between these two is determined by the procedure of the invention.

C) Look-up Table Updating for Self-Training Adaptive Equalizer

1) Performance Considerations

To determine equalizer performance, the sequence $\{y_n\}$ is input to a multi-level memoryless decision element that generates the sequence of estimated symbols $\{\hat{b}_n\}$. As a measure of system performance, the mean-square error $\epsilon_n^2$ defined by $$\epsilon_n^2 = E[e_n^2] = E[(y_n - b_n)^2], \quad (9)$$

is considered, where $\{e_n\}$ is the error sequence and E denotes the expectation operator of the sequence ensemble. If the sequence $\{b_n\}$ were known at the receiver, i.e., if a training sequence were used, a reference-directed stochastic gradient algorithm could be used to update the look-up values of an adaptive distributed-arithmetic equalizer and to reach the setting yielding the minimum mean-square error. It is desirable that the system does not use a training sequence. Therefore initial convergence of the look-up values is to be accomplished by self-training on the received data signal. A decision-directed stochastic gradient algorithm for the distributed-arithmetic adaptive equalizer presented above is formulated as follows:

$$d_{n+1}(j) = d_n(j) - \alpha \nabla e_n^2(j), j=0, \ldots 2^{N-1}-1, \quad (10)$$

where $\alpha$ is a positive constant, $$\nabla e_n^2(j) = \frac{\partial(y_n - b_n)^2}{\partial d_n(j)} \approx \quad (11)$$

$$2M\hat{e}_n \sum_{w=0}^{B} 2^{w-B} x_{n-k_0}^{(w)} \delta_{j,i_n}^{(w)}, j=0, \ldots, 2^{N-1}-1$$

and where $\hat{e}_n = y_n - \hat{b}_n$ is the estimated error, and $\delta_{i,j}$ is the Kronecker delta.

The decision-directed adaptive distributed-arithmetic equalizer does not operate correctly if all the look-up values are simultaneously equal to 0. In fact, if that event occurs, then the equalizer output is equal to zero, as shown by Eq. (7). Hence, the estimated error is also equal to zero and adaptation terminates. Therefore it is assumed that $0 < d_n(j) < 2, \forall j, \forall n$.

2) Improvements Suggested

The complexity of the system is reduced by the invention in that only one look-up value is updated at each iteration. The updating rate of the look-up values depends upon the joint probability distribution of the input samples, since the samples of the sequence $\{x_n^q\}$ are correlated. To obtain an updating rate which is approximately constant, a procedure randomly updating at each iteration either $d_n(i_n^{(B)})$ or $d_n(i_n^{(B-1)})$ is introduced by the invention. The simplified decision-directed stochastic gradient procedure is given by $$d_{n+1}(i_n^{(B-zn)}) = d_n(i_n^{(B-zn)}) - \alpha \cdot \hat{e}_n 2^{-zn} x_{n-k}^{0(B-zn)}, \quad (12)$$

where $\{z_n\}$ is a sequence of binary i.i.d. random variables, $z_n \in \{0, +1\}$, independent of the sequence $\{x_n\}$, and $\alpha$ is chosen to be equal to a power of two, so that at each iteration only one shift-and-add operation is required.

In the presence of channel distortion, when adaptation starts the symbol error rate can be so large that the stochastic gradient algorithm (12) fails, i.e., the look-up values do not converge to the optimum setting unless a training sequence is used. On the other hand, because of the inherent nonlinearity of the system during the adaptation process, the self-training adaptation algorithms devised for linear adaptive equalizers fail if applied to a distributed-arithmetic equalizer. In fact, in that case the look-up values converge with high probability to non-optimal settings which correspond to local minima of the mean-square error.

For linear adaptive equalizers, failure of decision-directed stochastic gradient algorithms is to be attributed to the large probability that the sign of the estimated error $\hat{e}_n$ differs from the sign of the true error $e_n$. However, if the magnitude of the equalizer output $y_n$ is greater than the largest output level of an ideal system, i.e., if $$|y_n| > 2M - 2, \quad (13)$$

then $$P\{\text{sign}(\hat{e}_n) = \text{sign}(e_n)\} \simeq 1, \quad (14)$$

where $P\{\omega\}$ denotes the probability of the event $\{\omega\}$.

On the other hand, when the distributed-arithmetic realization considered in Section 2 is used and condition (13) is satisfied, Eq.(7) yields $$P\{x_{n-k0}^{(w)} = \text{sign}(e_n)\} \simeq 1, \quad w = B, B-1. \quad (15)$$

In fact, since $0 < d_n(j) < 2, \forall j, \forall n$, if condition (13) is satisfied, then $\text{sign}(y_n) = x_{n-k0}^{(B)} = x_{n-k0}^{(B-1)}$ with high probability. Consequently, the sign of the estimated error, which is related to the sign of the true error by Eq. (14), is also equal with high probability to both most significant bits of the sample $x_{n-k0}$. Therefore one finds that, whenever condition (13) is satisfied, the component of a gradient vector to update $d_n(i_n^{(B-zn)})$ is positive with probability close to one.

Moreover, it is required that the steady-state system performance be close to that of a system employing a reference-directed stochastic gradient algorithm. Therefore the updating rule (12) is applied whenever the distance between the output $y_n$ and any of the $2M-1$ output levels of an ideal system are smaller than a given positive constant $\gamma < 1$. Finally, to reduce the probability of convergence to settings yielding a large mean square error, the look-up value $d_n(i_n^{(B-zn)})$ is increased by a positive constant whenever condition (13) is not satisfied and the distance between $y_n$ and any of the output levels of an ideal system is larger than $\gamma$.

According to the invention, the look-up table updating procedure for self-training adaptive equalization is formulated as follows:

$$d_{n+1}(i_n^{(B-zn)}) = d_n(i_n^{(B-zn)}) - \Delta d_n, \; 0 < d_{n+1}(i_n^{(B-zn)}) < 2, \quad (16)$$

where $$\Delta d_n = \begin{cases} 2^{zn}\alpha_1 & \text{if } |y_n| > 2M - 2 + \nu \\ \alpha_2 2^{-zn} x_{n-k0}^{(B-zn)} e_n & \text{if } |y_n - \hat{b}_n| < \nu \\ -2^{zn}\alpha_3 & \text{otherwise,} \end{cases} \quad (17)$$

and where $\alpha_1$, $\alpha_2$, and $\alpha_3$ are positive constants. FIG. 6 depicts $\Delta d_n$ versus $y_n$ for $x_{n-k0}^{(B-zn)} = 1$ and $M = 4$. To compute $d_{n+1}(i_n^{(B-zn)})$, the correction term defined in Eq. (17) is also represented by $B_d$ bits.

D) Example of an Equalizer Embodying the Invention

Figure 3B:
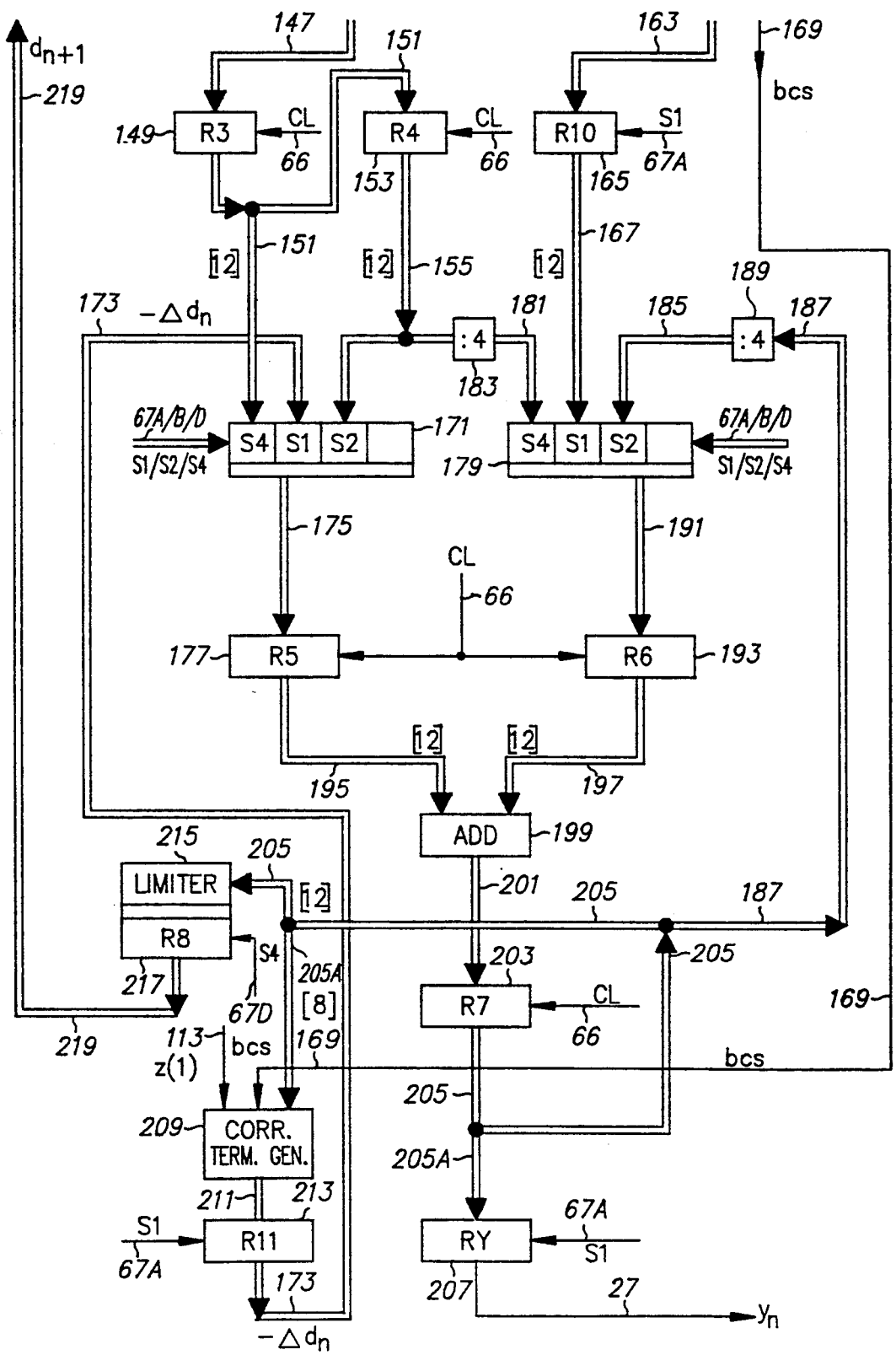

An implementation of the adaptive distributed-arithmetic equalizer for a quaternary PRIV system, which operates according to the described principles of the invented updating procedure, is shown in FIG. 3 (FIG. 3A/3B).

Units of this equalizer are controlled by several timing signals which are furnished by a timing signal generator 65 represented in FIG. 4A and whose time diagrams are shown in FIG. 4B. During each modulation interval, four pulses of a clock signal CL will occur (clock signal line 66). Furthermore, four consecutive phase signal pulses P1 ... P4, one during each quarter of a modulation interval (quarter-interval), are available. Binary selector signals S1 ... S4, furnished on lines 67 A ... D, respectively represent the four phase pulses. They are provided for selectively controlling the loading of registers, and for controlling several selectors each having four inputs and one output so that each one of the inputs appears at the selector output during one quarter of each modulation interval T.

The equalizer of FIG. 3 comprises a delay line 69 (corresponding to the delay line arrangement 35 in FIG. 2) consisting of five six-bit registers RX0 ... RX4, storing quantized received input samples $x_n$'s furnished to input 23. Storing of each input sample in register RX0, and further shifting through the other registers is effected once during each sampling period by the phase pulse P3 of selector signal S3 on line 67C.

The bits in the delay line registers are numbered b0 (least significant bit) through b5 (most significant bit). Output lines are so arranged that the first bits b0 of all five registers appear on lines 71A, the third bits b2 of all registers appear on lines 71B, and the fifth bits b4 of all five registers appear on lines 71C. Similary, the five bits b1, b3, and b5 of all registers appear on lines 71D, 71E, and 71F, respectively. The described arrangement is depicted in Table 1.

Lines 71A, 71B, and 71C are connected to three inputs of a selector 73 which also receives the three selector signals S1, S2, and S4 on lines 67A/B/D so that during three of the four quarter-intervals of each modulation interval, one of the five-bit input groups is selected. The four corresponding bits of registers RX0, RX1, RX3, and RX4 are then available on lines 77, and the respective corresponding bit bc-A of the register RX2 is available on line 79. In XOR circuitry 81, each of the four bits on lines 77 is logically combined with the bit bc-A on line 79, and the resulting four-bit group is stored in register RA (83), once per clock interval, and is then available on lines 87 as an address for a dual-port random access memory (RAM 89) containing the look-up table of equalizer look-up values.

The bits appearing on delay line outputs 71 D, 71E, and 71F are similarly selected by a selector 91. The bits available on output lines 93, 95 are logically combined in XOR circuitry 97 and stored in register RB (99) once in each clock period, to become available as addresses on lines 101.

Thus, during three of the quarter-intervals of each sampling interval, i.e., those defined by S4, S1, and S2, a pair of addresses A and B becomes available. The two addressed stored values are fetched from the look-up table 89, and are then furnished on lines 103 and 105, respectively, to registers R1 (107) and R2 (109), respectively. These table look-up values have a length of 12 bits each.

An important feature of the present invention is the selection and updating of a single one of the fetched values from the look-up table. For this purpose, the first bit b0 in register RX0 is separately available as control bit z(0) on a line 111, and the first bit b0 stored in register RX1 is separately available as control bit z(1) on a line 113. They are also shown in Table 1.

For later restoring of one updated look-up table value, one of the six addresses becoming available on lines 87 and 101 for addressing the look-up table in RAM 89, is selected and delayed. Each address pair A/B is presented to a selector 115, which depending on the binary value of the control bit z(0) on line 111, selects one address of the pair. One of the six addresses generated during each sampling interval (that corresponds to the address generated either by the most significant bits or by the second-most significant bits of the samples stored in the delay line) is stored, under control of phase pulse P4, in a delay register R12 (117), then shifted to a delay register R13 (119) in the next modulation interval, and then is transferred on lines 121 to the fourth input of selector 91 which also receives on a line 122 a fifth bit, set to a logical value of 1. Therefore, the address gated by selector 91 in quarter-interval P3 represented by selector signal S3, will become available during a quarter-interval P4 (when no values are read from the look-up table), as address iz on lines 101 for writing an updated value into the look-up table.

The 12 bits of a look-up table output value VL-A, stored in register R1 and appearing on output lines 123, are each logically combined in XOR circuitry 129 with the corresponding bit bc-A from line 79 (which was delayed by a pair of delay elements 125 under control of the clock signal CL), then appearing on line 127. After division by a factor of 2 in element 130 and sign extension, the result becomes available as 14-bit input on lines 131 to an adder 133. Similarly, each bit of an output value VL-B stored in register R2 and available on lines 137, is logically combined in XOR circuitry 143 with the corresponding bit bc-B from line 95 (delayed by delay element pair 139), then available on line 141. The result is sign-extended and becomes available on lines 145 as second input to adder 133.

The twelve most significant bits of each adder output value (147) are stored in register R3 (149) and are then available on lines 151. They are stored with the next pulse of clock signal CL in a register R4 (153) and are then available also on lines 155.

The two look-up table output values VL-A and VL-B stored in registers R1 and R2 and available on lines 123/137, and the corresponding single bits bc-A and bc-B (called "companion" single bits in the following), available on lines 127/141, are furnished to a selector 157, which selects, determined by the value of control bit z(0), one of these two values and its companion single bit. A selected one of the six values VL-A/VL-B and its companion single bit bcs (selected companion bit) are available on lines 159 and are stored in each modulation interval in a register R9 (161) under control of phase pulse P1 of selector signal S1 furnished on line 67A; the selected value $d_n$, available on lines 163, is transferred in the next modulation interval to a register R10 (165). This value (corresponding to the value selected either by the most significant bits or by the second-most significant bits of the samples stored in the delay line) is then available on lines 163, its companion single bit bcs on a line 169.

A selector 171 receives on its input lines 151 and 155 the contents of register R3 and register R4 and on its further input lines 173 a correction term (to be explained later), and selects each one of them in sequence per modulation interval under control of the selector signals S1 ... S4, for storing it through lines 175 in a register R5 (177). Similarly, a selector 179 receives on its input lines 181 the contents of register R4 divided by 4 in a shifting circuit 183, on its input lines 167 the contents of register R10, and on its input lines 185 an input value which is generated from an output value (to be explained later) on lines 187, divided by 4 in a shifting circuit 189; it selects each one of them in sequence during a modulation interval, and stores them through lines 191 in a register R6 (193).

The values stored in registers R5 and R6 are furnished through lines 195 and 197, respectively, to an adder 199. Its output which becomes available on lines 201 is stored with the next clock pulse in a register R7 (203). The eight most significant bits (205A) of the 12-bit output value on lines 205 are stored as equalizer output $y_n$ once per sampling interval (by phase pulse P1 of selector signal S1) in a register RY (207), and this value is furnished on lines 27 as equalizer output. In one of the quarter-intervals the 12-bit output value on line 205 is also fed back via lines 187 (and divider 189) to input 185 of selector 179 (as an intermediate step for accumulating the next output value of the equalizer).

The further circuitry of the equalizer shown in FIG. 3 is used for updating a single look-up table value per sampling interval. Of the value stored in register R7, available on lines 205, the eight most significant bits (205A) are transferred to a correction term generator 209, which will be shown in more detail in FIG. 5. At its inputs, the correction term generator also receives the selected single bit bcs available on line 169 (from register R9), and the control bit z(1) available on line 113. The generated correction term $-\Delta d_n$ appearing on output lines 211 is stored, once per modulation interval, in a register R11 (213) under control of phase pulse P1 of selector signal S1. It is then available on lines 173 as input to selector 171. Once per modulation interval the value $d_n$ stored in register R10 (which is a selected one of six values chosen during one modulation interval), and the correction term furnished by generator 209, are gated by selectors 171/179 and transferred through registers R5 and R6 to be added in adder 199, and the result is then available as update term on lines 205.

A limiter circuit 215 is provided which limits the update term from lines 205 between two preselected limit values, and the resulting updated look-up table value $d_{n+1}$ is stored in a register R8 (217), under control of phase pulse P4 of selector signal S4. The contents of register R8 is transferred through lines 219 as input to RAM 89, and is stored therein under control of the then available address on lines 101, to replace the previously chosen look-up table value $d_n$.

To summarize: The equalizer uses the bits of the stored received samples for generating addresses to choose look-up table values and combines these table values to generate one equalizer output $y_n$ per modulation interval. In addition, the equalizer circuitry selects one value $d_n$ of the look-up table values chosen for creating one output value $y_n$, generates a correction term $-\Delta d_n$ for it dependent on the output, adds the correction term to $d_n$, limits the result between two predetermined limit values, and stores it back as updated table value $d_{n+1}$ to replace the selected table value $d_n$.

Additional details of the correction term generator 209 of FIG. 3 are shown in FIG. 5. It receives the current equalizer output value $y_n$ on lines 205A from register R7 (eight most significant bits). It receives further the control signal $z(1)$ on line 113, and the selected single bit bcs on line 169, which represents the value $x_{n-k0}(B-zn)$ appearing in equation (17) above.

The correction term $-\Delta d_n$ furnished at the output 211 of the correction term generator, is chosen by a selector 225 among its three input values appearing on inputs 227, 229, and 231, under control of two binary control signals $a_{1,n}$ and $a_{2,n}$ furnished to two control inputs 233 and 235, respectively.

FIG. 6 shows the correction term $\Delta d_n$ as a function of $y_n$, for $x_{n-k0}(B-zn)=1$ and $M=4$.

Control signal $a_{1,n}$ is generated as follows: From the input value $y_n$ on lines 205A, an estimated symbol is obtained by a 7-level decision circuit 237 whose characteristic is shown in FIG. 7. The estimated symbol $\hat{b}_n$ appearing on lines 239 is subtracted from the input value $y_n$ in a subtractor 241 which, on its output 243, furnishes an estimated error value $\hat{e}_n$. This estimated error value is furnished to a 2-level decision circuit 245 where the error value is compared to a first threshold $t_1 = y$ to obtain the binary control signal $a_{1,n}$ on line 233. The characteristic of decision element 245 is shown in FIG. 8.

Control signal $a_{2,n}$ is generated as follows: In a further 2-level decision circuit 247, the input value $y_n$ is compared against a second threshold $t_2$ $2M-z+y$ to obtain the binary control signal $a_{2,n}$ on line 235. The characteristic of decision element 247 is shown in FIG. 9.

The three input values for selector 225 are generated as follows: In a power-of-two unit 249 (which actually is a shifting element), the control value $z(1)$ appearing on line 113 is used to generate the three terms $-2^{zn}$, $-2^{zn}$, $2^{zn}$ on lines 251, 253, and 255, respectively. Three constants $\alpha_1$, $\alpha_2$, $\alpha_3$ are provided by registers 257, 259, and 261, respectively. The term appearing on line 251 is multiplied in multiplying unit 263 by constant $\alpha_1$, to obtain on line 227 the value $d_{1,n}$ which is furnished to the first input of selector 225.

The term appearing on line 253 is multiplied in multiplying unit 265 by constant $\alpha_2$, and the result is again multiplied in multiplying unit 267 by the error value $\hat{e}_n$ appearing on line 243, to generate an intermediate term on lines 269. This intermediate term is multiplied, in a multiplying unit 271, by the selected single bit bcs appearing on line 169, to obtain on lines 229 the value $d_{2,n}$ as second input to selector 225. Since bcs is a single bit corresponding to the binary function $x_{n-k}0(B-zn)$, the multiplier 271 is an XOR circuitry.

The term on line 255 is multiplied, in a multiplying unit 273, by the third constant $\alpha_3$, to obtain on lines 231 the value $d_{3,n}$ as third input for selector 225.

If the three constants $\alpha_1$, $\alpha_2$, $\alpha_3$ are chosen to be positive integers and powers of two, then the registers 257, 259, 261 are not necessary, and the multiplying units 263, 265, 267, and 273 can be replaced by mere shifting units. Thus, the equalizer can be realized without any multiplier.

E) Operation of Equalizer and Updating Means

Table 2 (separated into tables 2A and 2B) illustrates the sequential operational steps of the equalizer described above, by listing the contents of the various registers (RX1 ... RX5, R1 ... R13, RY) in sequential quarter-intervals of three consecutive modulation intervals $T_n$ ... $T_{n+2}$. Each column of the table represents one quarter-interval, as indicated by a "1" in the respective P1/P2/P3/P4 row showing the phase pulses.

The equalizer delay line consisting of the five registers RX0 ... RX4 initially holds five consecutive input samples $x_n^q$ ... $x_{n-4}^q$. In the middle of the first interval $T_n$, a new input value $x_{n+1}^q$ enters the delay line at RX0, and the other values are shifted with the oldest value being dropped. Similarly, an enter-and-shift operation occurs in the middle of each following modulation interval.

The bits of all samples stored in the delay line at the beginning of an interval are used, in six groups of corresponding bits, to generate six addresses i1 ... i6, which are available in three consecutive quarter-intervals in the two registers RA and RB, as shown in Tab. 2A. Each pair of addresses are used to fetch two respective look-up table values which are then available (with one quarter-interval delay) in registers R1 and R2, respectively. Each pair of values (shown as VL-A and VL-B, respectively, in FIG. 3) is combined by dividing the first value, e.g. d(i1), by two in a shifting element, and adding the result to the second value, e.g. d(i2), to obtain an intermediate value J1, which is stored in the next quarter-interval in register R3. Thus, as shown in Tab. 2A, three intermediate values J1, J2, and J3 are available in consecutive quarter-intervals in register R3. With another delay of one quarter-interval, the same values are then also available in register R4.

By selective transfer operations between registers R3, R4 and R5, R6, R7, some of them with an intermediate division by a factor of 4, there will be available at the end of the second modulation interval $T_{n+1}$ in register R7 (Tab. 2B) a quantity which represents the output value $y_n$ (but with a twelve-bit precision instead of the final eight-bit precision at the equalizer output). This value in register R7 is a "weighted" sum of the three intermediate values J1, J2, J3, namely J3+J2/4+J1/16 (or d(i6)+d(i5)/2+d(i4)/4+d(i3)/8+d(i2)/16+ +-d(i1)/32). From the beginning of the next modulation interval $T_{n+2}$, the value $y_n$ (eight bits) is available in the output register RY.

A selected one of the six look-up values d(i1) ... d(i6) will be available as value $d_n$ in registers R9 and R10 during the second ($T_{n+1}$) and third ($T_{n+2}$) modulation intervals, respectively. The associated address iz will be available in registers R12 and R13 with a quarter-interval advance. In the second quarter-interval (P2) of the third modulation interval $T_{n+2}$, the selected look-up value $d_n$ will be available in register R6, and an associated correction term $-\Delta d_n$ (designated as $-\mathrm{grad}(n+0)$ in the table) will be available in register R5, cf. Tab. 2A.

Both are combined in an adding operation and the result is available in the next quarter-interval (P3) as intermediate term Jd in register R7, cf. Tab. 2B. This quantity is passed through a limiter, and is then available in the next quarter-interval (P4) as updated look-up value $d_{n+1}$ (term ud(n+0) in the table) in register R8. This value is then stored in the look-up table, using the selected address iz (which was stored in register R13 and is transferred into register RB where it becomes available in the last quarter-interval (P4) of the third modulation interval).

Thus, based on the samples stored in the equalizer delay line at the beginning of interval $T_n$, an output value $y_n$ becomes available in register RY at the end of the next interval $T_{n+1}$. Then, at the end of the following interval $T_{n+2}$ one corresponding updated look-up value $d_{n+1}$ becomes available in register R8, while the associated RAM address iz is then available in register RB.

TABLE 1

Bit Distribution in Delay Line 69 and on Output Lines 71A ... 71F/111/113

Delay Line 69

| | | | | | | |
|---|---|---|---|---|---|---|
| Register RX0 (Sample $X_{n-0}^q$): | $X_{n-0}^{(0)}$, | $X_{n-0}^{(1)}$, | $X_{n-0}^{(2)}$, | $X_{n-0}^{(3)}$, | $X_{n-0}^{(4)}$, | $X_{n-0}^{(5)}$ |
| Register RX1 (Sample $X_{n-1}^q$): | $X_{n-1}^{(0)}$, | $X_{n-1}^{(1)}$, | $X_{n-1}^{(2)}$, | $X_{n-1}^{(3)}$, | $X_{n-1}^{(4)}$, | $X_{n-1}^{(5)}$ |
| Register RX2 (Sample $X_{n-2}^q$): | $X_{n-2}^{(0)}$, | $X_{n-2}^{(1)}$, | $X_{n-2}^{(2)}$, | $X_{n-2}^{(3)}$, | $X_{n-2}^{(4)}$, | $X_{n-2}^{(5)}$ |
| Register RX3 (Sample $X_{n-3}^q$): | $X_{n-3}^{(0)}$, | $X_{n-3}^{(1)}$, | $X_{n-3}^{(2)}$, | $X_{n-3}^{(3)}$, | $X_{n-3}^{(4)}$, | $X_{n-3}^{(5)}$ |
| Register RX4 (Sample $X_{n-4}^q$): | $X_{n-4}^{(0)}$, | $X_{n-4}^{(1)}$, | $X_{n-4}^{(2)}$, | $X_{n-4}^{(3)}$, | $X_{n-4}^{(4)}$, | $X_{n-4}^{(5)}$ |

Bits b0/b2/b4 from RX2 each go to Line 79 as bc-A
Bits b1/b3/b5 from RX2 each go to Line 95 as bc-B

Output Lines 71

| | | | | | |
|---|---|---|---|---|---|
| Lines 71A (bits b0): | $X_{n-0}^{(0)}$, | $X_{n-1}^{(0)}$, | $X_{n-2}^{(0)}$, | $X_{n-3}^{(0)}$, | $X_{n-4}^{(0)}$ |
| Lines 71B (bits b1): | $X_{n-0}^{(1)}$, | $X_{n-1}^{(1)}$, | $X_{n-2}^{(1)}$, | $X_{n-3}^{(1)}$, | $X_{n-4}^{(1)}$ |
| Lines 71C (bits b2): | $X_{n-0}^{(2)}$, | $X_{n-1}^{(2)}$, | $X_{n-2}^{(2)}$, | $X_{n-3}^{(2)}$, | $X_{n-4}^{(2)}$ |
| Lines 71D (bits b3): | $X_{n-0}^{(3)}$, | $X_{n-1}^{(3)}$, | $X_{n-2}^{(3)}$, | $X_{n-3}^{(3)}$, | $X_{n-4}^{(3)}$ |
| Lines 71E (bits b4): | $X_{n-0}^{(4)}$, | $X_{n-1}^{(4)}$, | $X_{n-2}^{(4)}$, | $X_{n-3}^{(4)}$, | $X_{n-4}^{(4)}$ |
| Lines 71F (bits b5): | $X_{n-0}^{(5)}$, | $X_{n-1}^{(5)}$, | $X_{n-2}^{(5)}$, | $X_{n-3}^{(5)}$, | $X_{n-4}^{(5)}$ |

Control Bit Lines

Line 111: $X_{n-0}^{(0)} = z(0)$ (From Register RX0)
Line 113: $X_{n-1}^{(0)} = z(1)$ (From Register RX1)

TABLE 2A

Four-phase Sequencing of Equalizer Operation

| | 0 | 1 | 2 | 3 | 0 | 1 |
|---|---|---|---|---|---|---|
| P1 | ※ 1 | 0 | 0 | 0 | ※ 1 | 0 |
| P2 | 0 | 1 | 0 | 0 | 0 | 1 |
| P3 | 0 | 0 | 1 | 0 | 0 | 0 |
| P4 | 0 | 0 | 0 | 1 | 0 | 0 |
| RX0 | x(n + 0) | x(n + 0) | x(n + 1) | x(n + 1) | x(n + 1) | x(n + 1) |
| RX1 | x(n − 1) | x(n − 1) | x(n + 0) | x(n + 0) | x(n + 0) | x(n + 0) |
| RX2 | x(n − 2) | x(n − 2) | x(n − 1) | x(n − 1) | x(n − 1) | x(n − 1) |
| RX3 | x(n − 3) | x(n − 3) | x(n − 2) | x(n − 2) | x(n − 2) | x(n − 2) |
| RX4 | x(n − 4) | x(n − 4) | x(n − 3) | x(n − 3) | x(n − 3) | x(n − 3) |
| RA | i1(n + 0) | i3(n + 0) | i5(n + 0) | | | |
| RB | i2(n + 0) | i4(n + 0) | i6(n + 0) | | | |
| R1 | | d(i1(n + 0)) | d(i3(n + 0)) | d(i5(n + 0)) | | |
| R2 | | d(i2(n + 0)) | d(i4(n + 0)) | d(i6(n + 0)) | | |
| R3 | | | d(i2(n + 0)) + ½* d(i1(n + 0)) = J1(n + 0) | d(i4(n + 0)) + ½* d(i3(n + 0)) = J2(n + 0) | d(i6(n + 0)) + ½* d(i5(n + 0)) = J3(n + 0) | |
| R4 | | | | J1(n + 0) | J2(n + 0) | J3(n + 0) |
| R5 | | | | | J2(n + 0) | |
| R6 | | | | | J1(n + 0)/4 | |
| T | ← T(n) → | | | | ← T(n + 1) → | |

| | 2 | 3 | 0 | 1 | 2 | 3 |
|---|---|---|---|---|---|---|
| P1 | 0 | 0 | ※ 1 | 0 | 0 | 0 |
| P2 | 0 | 0 | 0 | 1 | 0 | 0 |
| P3 | 1 | 0 | 0 | 0 | 1 | 0 |
| P4 | 0 | 1 | 0 | 0 | 0 | 1 |
| RX0 | x(n + 2) | x(n + 2) | x(n + 2) | x(n + 2) | x(n + 3) | x(n + 3) |
| RX1 | x(n + 1) | x(n + 1) | x(n + 1) | x(n + 1) | x(n + 2) | x(n + 2) |
| RX2 | x(n + 0) | x(n + 0) | x(n + 0) | x(n + 0) | x(n + 1) | x(n + 1) |
| RX3 | x(n − 1) | x(n − 1) | x(n − 1) | x(n − 1) | x(n + 0) | x(n + 0) |
| RX4 | x(n − 2) | x(n − 2) | x(n − 2) | x(n − 2) | x(n − 1) | x(n − 1) |
| RA | | | | | | |
| RB | | | | | | iz(n + 0) |
| R1 | | | | | | |
| R2 | | | | | | |
| R3 | | | | | | |
| R4 | | | | | | |
| R5 | J3(n + 0) | | | −grad(n + 0) | | |
| R6 | J2(n + 0)/4 + J1(n + 0)/16 | | | d(iz(n + 0)) | | |

TABLE 2A-continued

| Four-phase Sequencing of Equalizer Operation | | |
|---|---|---|
| T | ← T(n + 1) → | ← T(n + 2) → |

TABLE 2B

Four-phase equencing of Equalizer Operation

|  | 0 | 1 | 2 | 3 | 0 | 1 | 2 | 3 |
|---|---|---|---|---|---|---|---|---|
| P1 | 1 | 0 | 0 | 0 | 1 | 0 | 0 | 0 |
| P2 | 0 | 1 | 0 | 0 | 0 | 1 | 0 | 0 |
| P3 | 0 | 0 | 1 | 0 | 0 | 0 | 1 | 0 |
| P4 | 0 | 0 | 0 | 1 | 0 | 0 | 0 | 1 |
| RX0 | x(n + 0) | x(n + 0) | x(n + 1) | x(n + 1) | x(n + 1) | x(n + 1) | x(n + 2) | x(n + 2) |
| RX1 | x(n − 1) | x(n − 1) | x(n + 0) | x(n + 0) | x(n + 0) | x(n + 0) | x(n + 1) | x(n + 1) |
| Rx2 | x(n − 2) | x(n − 2) | x(n − 1) | x(n − 1) | x(n − 1) | x(n − 1) | x(n + 0) | x(n + 0) |
| RX3 | x(n − 3) | x(n − 3) | x(n − 2) | x(n − 2) | x(n − 2) | x(n − 2) | x(n − 1) | x(n − 1) |
| RX4 | x(n + 4) | x(n + 4) | x(n + 3) | x(n + 3) | x(n + 3) | x(n + 3) | x(n + 2) | x(n + 2) |
| R7 |  |  |  |  |  | J2(n + 0) + J1(n + 0)/4 | J3(n + 0) | J3(n + 0) J2(n + 0)/4 J1(n + 0)/1 = y(n + 0) |
| R8 |  |  |  |  |  |  |  |  |
| R9 |  |  |  |  | d(iz(n + 0)) | d(iz(n + 0)) | d(iz(n + 0)) | d(iz(n + 0)) |
| R10 |  |  |  |  |  |  |  |  |
| R11 |  |  |  |  |  |  |  |  |
| R12 |  |  | iz(n + 0) | iz(n + 0) | iz(n + 0) | iz(n + 0) |  |  |
| R13 |  |  |  |  |  |  |  | iz(n + 0) |
| RY |  |  |  |  |  |  |  |  |
| T | ← T(n) → | | | | ← T(n + 1) → | | | |

|  |  | 0 | 1 | 2 | 3 |
|---|---|---|---|---|---|
|  | P1 | 1 | 0 | 0 | 0 |
|  | P2 | 0 | 1 | 0 | 0 |
|  | P3 | 0 | 0 | 1 | 0 |
|  | P4 | 0 | 0 | 0 | 1 |
|  | RX0 | x(n + 2) | x(n + 2) | x(n + 3) | x(n + 2) |
|  | RX1 | x(n + 1) | x(n + 1) | x(n + 2) | x(n + 2) |
|  | RX2 | x(n + 0) | x(n + 0) | x(n + 1) | x(n + 1) |
|  | RX3 | x(n − 1) | x(n − 1) | x(n + 0) | x(n + 0) |
|  | RX4 | x(n − 2) | x(n − 2) | x(n − 1) | x(n − 1) |
|  | R7 |  |  | d(iz(n + 0)) − grad(n + 0) = Jd(n + 0) |  |
|  | R8 |  |  |  | ud(n + 0) |
|  | R9 |  |  |  |  |
|  | R10 | d(iz(n)) | d(iz(n)) | d(iż(n)) | d(iz(n)) |
|  | R11 | −grad(n) | −grad(n) | −grad(n) | −grad(n) |
|  | R12 |  |  |  |  |
|  | R13 | iz(n + 0) | iz(n + 0) | iz(n + 0) |  |
|  | RY | y(n + 0) | y(n + 0) | y(n + 0) | y(n + 0) |
|  | T |  | ← T9N + 2) → | | |

We claim:

1. A method of adapting a distributed-arithmetic equalizer for channel equalization in a partial response communication or storage system by updating table values $d_n(j)$ stored in a look-up table, said table values $d_n(j)$ for determining said equalizer characteristics, said equalizer generating an equalizer output value $y_n$ during each one of a plurality of successive modulation intervals, said method comprising the following steps executed during each successive modulation interval:

fetching at least two table values $d_n(j)$ from said look-up table, the addresses of said fetched table values being defined by selected bits representing stored received signal samples $x_n{}^q$;

performing at least one shift-and-add operation on said fetched table values;

defining a binary control value $z_n$, said binary control signal represented by at least one predetermined bit z(O) selected from said stored signal samples $x_n{}^q$;

selecting, dependent on said binary control value, one of said fetched table values;

generating a correction term $-\Delta d_n$, said correction term being dependent on said equalizer output value $y_n$ and said binary control value $z_n$;

adding said correction term $-\Delta d_n$ to said selected one $d_n$ of said fetched table values for providing an updated table value $d_{n+1}$; and storing said updated table value $d_{n+1}$ in said look-up table, said selected one $d_n$ of said fetched table values being replaced by said updated table value $d_{n+1}$ in said look-up table.

2. A method according to claim 1 including the additional step of limiting the value of said updated table value $d_{n+1}$ between two predetermined values.

3. A method according to claim 1 wherein said step of generating said correction term $-\Delta d_n$ comprises the steps of:

comparing said equalizer output value $y_n$ to a target set of symbols, said target set of symbols determined by the modulation scheme being used;

choosing said correction term $-\Delta d_n$ equal to $f_1(z_n)$ if $|y_n|$ is greater than $(M+\gamma)$, where $f_1(z_n)$ is a predetermined first function of said binary control value, M is the largest value in said target set of symbols, and $\gamma$ is a first predetermined constant;

choosing said correction term $-\Delta d_n$ equal to $f_2(z_n) \cdot x_{n-k0}^{(B-z_n)} \cdot \hat{e}_n$ if $|\hat{e}_n|$ is less than $\gamma$, where $f_2(z_n)$ is a predetermined second function of said binary control value, $\hat{e}_n$ is the difference between said equalizer output value and the closest symbol in said target set of symbols, and $x_{n-k0}^{(B-z_n)}$ is a binary function of one selected bit of a predetermined one of the stored received signal samples $x_n^q$, selected dependent on whether said binary control value $z_n=1$ or $z_n=0$; and choosing said correction term $-\Delta d_n$ equal to $f_3(z_n)$ otherwise, where $f_3$ is a predetermined third function of said binary control value.

4. A method according to claim 1, including the additional steps of:

storing N signal samples $x_n^q$ each of said signal samples comprising (B+1) bits;

defining (B+1) addresses for fetching said look-up table values, each from a group of N corresponding bits $x_n^{(w)}$ for w=0, elipsis, B, by logically combining a predetermined companion bit (bc) of said N corresponding bits with each one of the remaining bits of that group;

preselecting a given pair (VL-A, VL-B) from all said fetched table values and the pair of said predetermined companion bits (bc-A, bc-B) used for generating the addresses associated with said given pair of fetched table values, respectively; and dependent on said binary control value $z_n$, selecting said one look-up table value $d_n$ of said given pair of fetched table values for updating and selecting its associated predetermined companion bit (bcs) as an additional input for generating said correction term $-\Delta d_n$.

5. A method according to claim 3, including the additional steps of:

storing N signal samples $x_n^q$, each of said signal samples comprising (B+1) bits;

defining (B+1) addresses for fetching said look-up table values, each from a group of N corresponding bits $x_n^{(w)}$ for w=0, elipsis, B, by logically combining a predetermined companion bit (bc) of said N corresponding bits with each one of the remaining bits of that group;

preselecting a given pair (VL-A, VL-B) from all said fetched table values and the pair of said predetermined companion bits (bc-A, bc-B) used for generating the addresses associated with said given pair of fetched table values, respectively; and dependent on said binary control value $z_n$, selecting said one look-up table value $d_n$ of said given pair of fetched table values for updating and selecting its associated predetermined companion bit (bcs) as an additional input for generating said correction term $-\Delta d_n$.

6. A method according to claim 3, wherein said predetermined first function is defined as $$f_1(z_n) = -2^{z_n} \cdot \alpha_1,$$

where $\alpha_1$ is a first predetermined power of two.

7. A method according to claim 3, wherein said predetermined second function is defined as $$f_2(z_n) = -2^{-z_n} \cdot \alpha_2,$$

where $\alpha_2$ is a second predetermined power of two.

8. A method according to claim 3, wherein said predetermined third function is defined as $$f_3(z_n) = 2^{z_n} \cdot \alpha_3,$$

where $\alpha_3$ is a third predetermined power of two.

* * * * *

UNITED STATES PATENT AND TRADEMARK OFFICE
CERTIFICATE OF CORRECTION

PATENT NO. : 5,319,674

DATED : June 7, 1994

INVENTOR(S) : G. Cherubini

Page 1 of 8

It is certified that error appears in the above-indentified patent and that said Letters Patent is hereby corrected as shown below:

Column 2, line 59, delete whole line, insert -- $x_{n-k_0}^{(0)} = 1$;--

Column 3, line 49, delete whole line, insert -- where
$x_n^{(w)} = 2u_n^{(w)} - 1 \in \{-1, +1\}$. In the following,--

Column 3, line 50, delete whole line, insert -- since there is one-to-one correspondence between $x_n^{(w)}$--

Column 3, line 51, delete whole line, insert -- and $u_n^{(w)}$, they will both be referred to as bits, bearing in--

Column 4, line 2, delete whole line, insert -- equalizer, and the vector
$\underline{x}_n^q = \{x_n^q, \ldots, x_{n-N+1}^q\}$ of--

Column 4, line 18, delete whole line, insert -- $B + 1$ look-up values
$v(x_n^{(w)}, \ldots, x_{n-N+1}^{(w)})$ for $w = 0$,--

Column 4, line 21, delete whole line, insert -- of the vector
$\underline{x}_n^{(w)} = \{x_n^{(w)}, \ldots, x_{n-N+1}^{(w)}\}$, precomputed--

Column 4, line 23, delete whole line, insert -- Since $v(x_n^{(w)}, \ldots, x_{n-N+1}^{(w)})$ and
$v(-x_n^{(w)}, \ldots,$ --

Column 4, line 24, delete whole line, insert -- $-x^{<(w)>}{}_{<n-N+1>})$ differ only in their sign, i.e.,--

UNITED STATES PATENT AND TRADEMARK OFFICE
CERTIFICATE OF CORRECTION

PATENT NO. : 5,319,674

DATED : June 7, 1994

INVENTOR(S) : G. Cherubini

It is certified that error appears in the above-indentified patent and that said Letters Patent is hereby corrected as shown below:

Column 4, line 25, delete whole line, insert — $v(\underline{x}_h^{(w)}) = -v(-\underline{x}_h^{(w)})$, only $2^{N-1}$ memory locations are—

Column 4, line 36, delete whole line, insert — $x_{h,k_0}^{(w)}$ determines whether the selected coefficient is—

Column 5, line 15, delete whole line, insert — column contains a complete value $x_h^q$, each row contains—

Column 5, line 16, delete whole line, insert — the corresponding bits $(x_h^{(w)} \ldots x_{h,N+1}^{(w)})$ of all values—

Column 5, line 36, delete whole line, insert — fetching of one look-up value $d_n(i_h^{(w)})$ which is fur—

Column 5, line 38, delete whole line, insert — ing means 45, by a single bit $x_{h,k_c}^{(w)}$ which is available—

Column 5, line 40, delete whole line, insert — group $(x_h^{(w)} \ldots x_{h,N+1}^{(w)})$ presently used to compute an—

Column 5, line 42, delete whole line, insert — $x_{h,k_0}^{(w)}$ of the input sample presently available at the—

Column 5, line 65, delete whole line, insert — and all addresses $i_h^{(w)}$ and corresponding look-up values—

UNITED STATES PATENT AND TRADEMARK OFFICE
CERTIFICATE OF CORRECTION

PATENT NO. : 5,319,674
DATED : June 7, 1994
INVENTOR(S) : G. Cherubini

It is certified that error appears in the above-indentified patent and that said Letters Patent is hereby corrected as shown below:

Column 5, line 66, delete whole line, insert -- $d_n(i_n^{(w)})$ chosen to compute $y_n$, on lines 60 and 61, re- --

Column 5, line 67, delete whole line, insert --    -spectively. The single bits $x_{n-k_0}^{(w)}$ which previously--

Column 6, line 3, delete whole line, insert -- $d_{n+1}(i_n^{(w_0)})$ and its corresponding address $i_n^{(w_0)}$, where --

Column 6, line 21, delete whole line, insert --

$$\varepsilon_n^2 = E[e_n^2] = E[(y_n - b_n)^2] \; . -- \qquad (9)$$

Column 6, line 39, delete whole line, insert --

$$d_{n+1}(j) = d_n(j) - \alpha \nabla e_n^2(j) \; , \; j = 0, \ldots, 2^{N-1} - 1 \; . -- \qquad (10)$$

Column 6, line 44, 45, 46, 47, delete equation insert equation (11) --

$$\nabla e_n^2(j) = \frac{\partial (y_n - b_n)^2}{\partial d_n(j)} \simeq 2M \hat{e}_n \sum_{w=0}^{B} 2^{w-B} x_{n-k_0}^{(w)} \delta_{j, i_n^{(w)}} \; , \; j = 0, \ldots, 2^{N-1} - 1 \; -- (11)$$

UNITED STATES PATENT AND TRADEMARK OFFICE
CERTIFICATE OF CORRECTION

PATENT NO. : 5,319,674
DATED : June 7, 1994
INVENTOR(S) : G. Cherubini

Page 4 of 8

It is certified that error appears in the above-indentified patent and that said Letters Patent is hereby corrected as shown below:

Column 7, delete line 1 and 2, insert equation (12) --

$$d_{n+1}(i_n^{(B-z_n)}) = d_n(i_n^{(B-z_n)}) - \alpha \hat{e}_n 2^{-z_n} x_{n-k_0}^{(B-z_n)} , - \qquad (12)$$

Column 7, line 39, delete whole line, insert --

$$P\{x_{n-k_0}^{(w)} = \text{sign}(\hat{e}_n)\} \simeq 1 , \quad w = B, B-1 . - \qquad (15)$$

Column 7, line 42, delete whole line, insert --fied, then $\text{sign}(y_n) = x_{n-k_0}^{(B)} = x_{n-k_0}^{(B-1)}$ with high--

Column 7, line 46, delete whole line, insert -- significant bits of the sample $x_{n-k_0}^{(B)}$. Therefore one--

UNITED STATES PATENT AND TRADEMARK OFFICE
CERTIFICATE OF CORRECTION

PATENT NO. : 5,319,674
DATED : June 7, 1994
INVENTOR(S) : G. Cherubini

It is certified that error appears in the above-indentified patent and that said Letters Patent is hereby corrected as shown below:

Column 8, line 5, 6, 7, 8, 9, delete equation, insert equation (17) --

$$\Delta d_n = \begin{cases} 2^{z_n} \alpha_1 & \text{if } |y_n| > 2M - 2 + \gamma \\ \alpha_2 2^{-z_n} x_{n-k_0}^{(B-z_n)} \hat{e}_n & \text{if } |y_n - \hat{b}_n| < \gamma \\ -2^{z_n} \alpha_3 & \text{otherwise ,} \end{cases} \tag{17}$$

Column 8, line 12, delete whole line, insert -- depicts $\Delta d_n$ versus $y_n$ for $x_{n-k_0}^{(B-z_n)} = 1$ and $M = 4$. To--

Column 11, line 30, delete whole line, insert -- $y_n$ for $x_{n-k_0}^{(B-z_n)} = 1$ and $M = 4$.--

Column 11, line 67, delete whole line, insert -- corresponding to the binary function $x_{n-k_0}^{(B-z_n)}$, the--

Column 12, line 22, delete whole line, insert -- samples $x_{\hat{n}}^q \ldots x_{\hat{n}-4}^q$. In the middle of the first interval--

UNITED STATES PATENT AND TRADEMARK OFFICE
CERTIFICATE OF CORRECTION

PATENT NO. : 5,319,674

DATED : June 7, 1994

INVENTOR(S) : G. Cherubini

It is certified that error appears in the above-indentified patent and that said Letters Patent is hereby corrected as shown below:

Column 13 and 14, delete Table 1 in its entirety, and replace Table 1 as follows:

Table 1
Bit Distribution in Delay Line 69 and on Output Lines 71A...71F / 111 / 113

Delay Line 69

Register RX0 (Sample $x_{n-0}$): $x_{n-0}^{(0)}$, $x_{n-0}^{(1)}$, $x_{n-0}^{(2)}$, $x_{n-0}^{(3)}$, $x_{n-0}^{(4)}$, $x_{n-0}^{(5)}$ Register RX1 (Sample $x_{n-1}$): $x_{n-1}^{(0)}$, $x_{n-1}^{(1)}$, $x_{n-1}^{(2)}$, $x_{n-1}^{(3)}$, $x_{n-1}^{(4)}$, $x_{n-1}^{(5)}$ Register RX2 (Sample $x_{n-2}$): $x_{n-2}^{(0)}$, $x_{n-2}^{(1)}$, $x_{n-2}^{(2)}$, $x_{n-2}^{(3)}$, $x_{n-2}^{(4)}$, $x_{n-2}^{(5)}$ Register RX3 (Sample $x_{n-3}$): $x_{n-3}^{(0)}$, $x_{n-3}^{(1)}$, $x_{n-3}^{(2)}$, $x_{n-3}^{(3)}$, $x_{n-3}^{(4)}$, $x_{n-3}^{(5)}$ Register RX4 (Sample $x_{n-4}$): $x_{n-4}^{(0)}$, $x_{n-4}^{(1)}$, $x_{n-4}^{(2)}$, $x_{n-4}^{(3)}$, $x_{n-4}^{(4)}$, $x_{n-4}^{(5)}$ Bits b0/b2/b4 from RX2 each go to Line 79 as bc-A Bits b1/b3/b5 from RX2 each go to Line 95 as bc-B

Output Lines 71

Lines 71A (bits b0): $x_{n-0}^{(0)}$, $x_{n-1}^{(0)}$, $x_{n-2}^{(0)}$, $x_{n-3}^{(0)}$, $x_{n-4}^{(0)}$ Lines 71B (bits b1): $x_{n-0}^{(1)}$, $x_{n-1}^{(1)}$, $x_{n-2}^{(1)}$, $x_{n-3}^{(1)}$, $x_{n-4}^{(1)}$ Lines 71C (bits b2): $x_{n-0}^{(2)}$, $x_{n-1}^{(2)}$, $x_{n-2}^{(2)}$, $x_{n-3}^{(2)}$, $x_{n-4}^{(2)}$ Lines 71D (bits b3): $x_{n-0}^{(3)}$, $x_{n-1}^{(3)}$, $x_{n-2}^{(3)}$, $x_{n-3}^{(3)}$, $x_{n-4}^{(3)}$ Lines 71E (bits b4): $x_{n-0}^{(4)}$, $x_{n-1}^{(4)}$, $x_{n-2}^{(4)}$, $x_{n-3}^{(4)}$, $x_{n-4}^{(4)}$ Lines 71F (bits b5): $x_{n-0}^{(5)}$, $x_{n-1}^{(5)}$, $x_{n-2}^{(5)}$, $x_{n-3}^{(5)}$, $x_{n-4}^{(5)}$

Control Bit Lines

Line 111:   $x_{n-0}^{(0)} = z(0)$   (From Register RX0)

Line 113:   $x_{n-1}^{(0)} = z(1)$   (From Register RX1)–

UNITED STATES PATENT AND TRADEMARK OFFICE
CERTIFICATE OF CORRECTION

PATENT NO. : 5,319,674
DATED : June 7, 1994
INVENTOR(S) : G. Cherubini

It is certified that error appears in the above-indentified patent and that said Letters Patent is hereby corrected as shown below:

Column 15/16, in the heading, delete "equencing", insert -- Sequencing --.

Column 15, line 61, delete whole line, insert -- received signal samples $x_n^g$:--

Column 15, line 66, delete whole line, insert -- $z(0)$ selected from said stored signal samples $x_n^g$.--

Column 17, line 4, delete whole line, insert -- $f_2(z_n) \cdot x_n^{(B-i_n)} \cdot \hat{e}_n$, if $|\hat{e}_n|$ is less than $\gamma$, where--

Column 17, line 9, delete whole line, insert -- in said target set of symbols, and $x_n^{(B-i_n)}$ is a--

Column 17, line 12, delete whole line, insert -- $x_n^g$, selected dependent on whether said binary--

Column 17, line 20, delete whole line, insert -- storing N signal samples $x_n^g$, each of said signal sam- --

Column 17, line 24, delete whole line, insert -- bits $x_n^{(w)}$ for $w = 0, ..., B$, by logically combin- --

Column 18, line 3, delete whole line, insert -- storing N signal samples $x_n^g$, each of said signal sam- --

UNITED STATES PATENT AND TRADEMARK OFFICE
CERTIFICATE OF CORRECTION

PATENT NO. : 5,319,674
DATED : June 7, 1994
INVENTOR(S) : G. Cherubini

It is certified that error appears in the above-indentified patent and that said Letters Patent is hereby corrected as shown below:

Column 18, line 7, delete whole line, insert -- bits $x_h^{(w)}$ for w = 0, elipsis ..., B, by logically combin- --

Signed and Sealed this

Twenty-eight Day of March, 1995

Attest:

BRUCE LEHMAN

Attesting Officer     Commissioner of Patents and Trademarks